E. P. NICHOLSON.
METHOD OF MANUFACTURING ARTICLES OF SYNTHETIC COMPOSITION.
APPLICATION FILED AUG. 23, 1916.
1,212,098.
Patented Jan. 9, 1917.
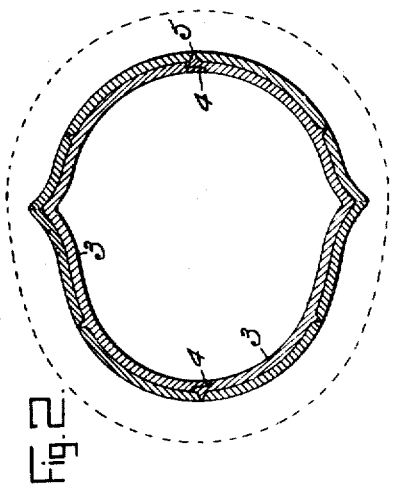
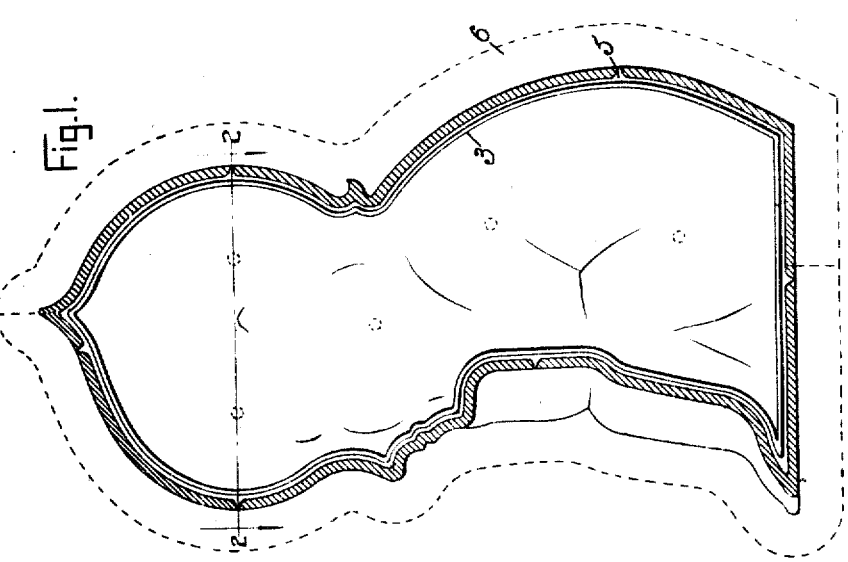
WITNESSES
INVENTOR
E. P. Nicholson
BY
ATTORNEYS

UNITED STATES PATENT OFFICE.

EBERHARDT P. NICHOLSON, OF NEW YORK, N. Y.

METHOD OF MANUFACTURING ARTICLES OF SYNTHETIC COMPOSITION.

1,212,098.

Specification of Letters Patent.

Patented Jan. 9, 1917.

Application filed August 23, 1916. Serial No. 116,420.

*To all whom it may concern:*

Be it known that I, EBERHARDT P. NICHOLSON, a citizen of the United States, and a resident of the city of New York, Richmond Hill, borough of Queens, in the county of Queens and State of New York, have invented a new and Improved Method of Manufacturing Articles of Synthetic Composition, of which the following is a full, clear, and exact description.

My invention relates to the manufacture of articles from a synthetic composition, and it has reference more particularly to the molding of same.

The object of the invention is to provide a simple and inexpensive method for manufacturing articles of synthetic composition.

In the manufacture of articles of synthetic composition it is necessary to provide a core about which the synthetic composition is to be formed within a mold. In view of the irregularity of such articles, as, for example, doll heads, bodies, etc., the core must be made of a number of parts to be extracted through an opening narrower than the cross section of the hollow of the article. This building up and extracting of the cores requires considerable time and increases the price of the article, in view of the labor expended thereupon.

The object of my invention is to eliminate the use of collapsible or sectional cores and substitute therefor a hollow core about which the synthetic material is molded within a mold and which core remains part of the molded article.

To illustrate the method, drawings are appended in which—

Figure 1 is a longitudinal section through an article molded in accordance with my method; and Fig. 2 is a cross section through the article on line 2—2, Fig. 1.

Cores of the above character may be manufactured of any suitable material, papier-mâché, for example. The core is pressed in dished halves 3 by dies giving to it the shape of the article which is to be molded about the core. The halves of the core are prevented from relative displacement by rabbeting the meeting edges 4 so that they interengage. Other well known means can be employed for the same purpose. The outer surface of the core has a number of projections 5 provided at suitable intervals from one another. These projections maintain the core in proper position within a mold 6, shown in dotted lines in Figs. 1 and 2, thereby providing a uniform thickness within the mold about the core.

The halves of the core are bound together by glue, or any other suitable cement, which is introduced between the meeting edges of the halves. This binding makes a unit out of the core halves. The unit is then dipped into a semi-plastic solution the consistency of which is such that it adheres easily to the surface of the core and forms a comparatively thick film on the surface of the core dipped therein. The core covered with the film of synthetic composition is then placed into the mold and pressure is applied to compress the film on the surface of the core and also to render the features of the article sharp. The projections 5 on the surface of the core, in addition to properly spacing the core within the mold, also presents a gain for the film of the synthetic composition on the surface of the core.

The pressure applied to the mold to mold the article about the core causes the compression of the coating on the core and slightly that of the core within the molded article. The tendency for restitution maintains the core firmly against the coating molded about the core. The hollow core which forms part of the article does not add material weight to the finished article, but it does materially increase the resistance of the article and its unbreakable qualities.

The price of the hollow cores which form the base of the articles is comparatively minim, for they can be made of very cheap material. There is no extra labor, after the cores have been made, for placing and extracting the same from the articles molded thereabout. The cores expedite the molding considerably and facilitate the retention of the synthetic composition on the surface of the molded article, for the reason that the material used may be of a character having a rough surface to which the synthetic composition will adhere easily.

It is self-evident that the halves of the core do not have to be totally closed as shown in the drawings, but where it is possible it is preferable, for the resistance of the article is considerably increased and its unbreakable qualities increased therewith. In cases where doll heads or bodies are molded, the core will be open at the places where the article is to be open. Another advantage of forming the molds of halves is that there is no necessity of a perfect match between the halves. A slight variation between the halves will in no way affect the article which is to be molded thereon, this being taken care of by the mold which shapes the synthetic composition about the core, and, as has been pointed out, the core being hollow it will give under the pressure applied to the mold.

I claim:

1. A method of manufacturing articles of synthetic composition, which consists in forming a hollow core the surface of which presents protuberances for centering the core in a mold and for providing a grip for a coating, dipping the core into a solution of synthetic composition of a consistency sufficient to form a thick film on the surface of the core, and placing the core with the coating into a mold and subjecting the mold to pressure.

2. A method of manufacturing articles of synthetic composition, which consists in forming a hollow core of halves with protuberances on the outer surface of the core, cementing the halves, dipping the cemented halves into a solution of synthetic composition of a consistency sufficient to form a thick coating on the surface of the core, placing the core with the coating thereon into the mold, then subjecting the mold to pressure, the protuberances on the core centering the same in the mold and controlling the uniformity of the coating on the core.

EBERHARDT P. NICHOLSON.